United States Patent [19]
Korneliussen

[11] Patent Number: 6,155,837
[45] Date of Patent: Dec. 5, 2000

[54] FIRE SIMULATOR

[76] Inventor: Kjell Korneliussen, Munkerekkveien 120, N-3142 Vestskogen, Norway

[21] Appl. No.: 09/381,458

[22] PCT Filed: Mar. 20, 1998

[86] PCT No.: PCT/NO98/00089

§ 371 Date: Sep. 21, 1999

§ 102(e) Date: Sep. 21, 1999

[87] PCT Pub. No.: WO98/43224

PCT Pub. Date: Oct. 1, 1998

[30] Foreign Application Priority Data

Mar. 21, 1997 [NO] Norway ..................................... 971330

[51] Int. Cl.⁷ ..................................................... G09B 19/00
[52] U.S. Cl. ............................ 434/226; 496/178; 40/406; 40/428
[58] Field of Search ...................... 472/65, 134; 934/226; 40/428, 439, 440, 406, 508, 509; 446/178, 179, 199

[56] References Cited

U.S. PATENT DOCUMENTS

| | | | |
|---|---|---|---|
| 1,458,526 | 6/1923 | De Elorza | 40/406 |
| 1,824,388 | 9/1931 | Birch | 472/65 |
| 2,348,250 | 5/1944 | Gardner et al. | 446/178 |
| 3,159,935 | 12/1964 | Rubens | 446/199 |
| 3,180,043 | 4/1965 | Larson | 40/406 |
| 3,395,475 | 8/1968 | Moss | 40/428 |
| 3,726,025 | 4/1973 | Salem . | |
| 3,742,189 | 6/1973 | Conroy et al. . | |
| 4,965,707 | 10/1990 | Butterfield | 40/428 |
| 5,186,675 | 2/1993 | Stoddard | 446/178 |

FOREIGN PATENT DOCUMENTS 0 611 921   8/1994   European Pat. Off. .

*Primary Examiner*—Sam Rimell
*Attorney, Agent, or Firm*—Young & Thompson

[57] ABSTRACT

A device for simulation of fire for use during fire drills and similar exercises, includes one or more chambers, each of which is connected to one or more air tubes made of a flexible, preferably substantially gas-tight fabric, where the air tubes may be supplied with air through the chamber to which they are connected, and where movers are provided on the device to cause the air tubes to swing from side to side.

15 Claims, 5 Drawing Sheets

FIRE SIMULATOR

BACKGROUND OF THE INVENTION

The present invention relates to a flame simulator for use in fire drills, smoke rescue and breathing apparatus training, and readiness exercises.

DESCRIPTION OF THE RELATED ART

More and more workplaces are being required by the authorities to have emergency teams available at all times with a view toward maintenance of health, milieu and security (HMS). These stand-by units must have training and practice, and increasingly tight restrictions on the discharge of contaminating substances into the environment limits the opportunities for realistic fire drills, as permission is no longer granted to the same extent as previously to ignite a fire and cause pollution with smoke discharge. Consequently, the pedagogical value of a fire drill is often diminished due to a lack of realism, when fire-fighting or evacuation training must be theoretical, out of consideration for fire and explosion risks and insufficient smoke discharge permits, or due to the fact that training must take place in locations other than the workplace—a factor reducing the value of the exercise.

Thus, there is a clear need for new pedagogical material for fire drills which will permit tactical fire drills to be conducted at the relevant workplace under safe and nonpolluting conditions, using appropriate communications and extinguishing agents.

SUMMARY OF THE INVENTION

The goal of the present invention is to provide a simulator for use during these types of exercises.

This is achieved according to the present invention with the aid of a device for simulation of fire for use during fire drills and similar exercises, comprising one or more chambers, each of which is connected to one or more tubular tongue-shaped members, hereafter referred to as "air tubes," made of a flexible, preferably substantially gas-tight fabric, wherein the air tubes may be supplied with air through the chamber to which they are connected, and wherein means are provided on the device to cause the air tubes to swing from side to side.

By using the device according to the present invention, it is possible to practice fire-extinguishing and evacuation drills with harmless, cool and fluorescent flame-simulating fabric tubes which will move as realistically as possible like tongues of fire, are capable of discharging smoke, and may be "extinguished" and "reignited" like real flames.

The present device may be transported in a packed state and is positioned at a place where it is desired to indicate that a fire is burning during a fire drill, for example, to show that a door, corridor, or similar opening is blocked by flames; this provides an entirely different degree of realism than hanging a note or sign on the wall with the inscription "fire."

U.S. Pat. No. 2,561,016 shows an inflatable sign having a ballast chamber at the bottom thereof for temporary signalling in connection with road work, etc. When this sign is inflated, however, it stands stationary and cannot give the illusion of flames.

U.S. Pat. No. 1,824,388 and 3,180,043 describe devices where a plurality of streamers made of a flexible material are secured at one end thereof, and where air is blown up from underneath to cause the streamers to be blown upwards and to flap in the air stream, thereby giving a convincing representation of flames. The "flames" created here, however, will be very sensitive to wind and will require the supply of a relatively large quantity of air in order to produce sufficiently large "flames." For the same reason, they will not tolerate extinguishing agents.

BRIEF DESCRIPTION OF THE DRAWINGS

The invention will now be described with the aid of the attached figures, wherein.

DESCRIPTION OF THE PREFERRED EMBODIMENTS

The embodiment forms shown on the figures have in common the feature that they are constructed a base member 1, 20. Base member 1, 20 is a box, which optionally may be divided into two or more sections and may serve both as a transport case for the device, as a protection for the inner components of the device, and a support for a plurality of air tubes 5, 39.

The air tubes are by preference made of a thin, flexible and preferably almost air-tight fabric which, to enhance the realism of the effect, is preferably "flame colored," i.e., yellow, orange, red, etc. The air tubes 1, 39 are not filled with air when the device is not in use. When in use the air tubes 5, 39 are filled with air from an external air supply, such as a compressor or container for compressed air. In a particularly inflammable environment there may also be used fire-retardant gas., such as nitrogen. The air tubes 5, 39 thus are sealed at the end thereof which projects upward during use, and they are secured at the other open end thereof to base member 1, 20 and are connected to the air supply such that air tubes 5, 39 are inflated and thereby extend upward above base member 1, 20 like "flames."

When air tubes 5, 39 have been inflated, to enhance their realistic effect they are set in a swinging motion with the aid of means provided in base member 1, 20. During a fire drill the flame simulator may be "extinguished" with the aid of conventional fire extinguishing agents, e.g., water. When the "flames" are "extinguished" in this manner, the air is released from air tubes 5, 39 causing the air tubes 5, 39 to collapse. When air is fed into the device again, the "flames" are able to flare up again.

Two nonrestrictive embodiment forms of the present flame simulator are described below.

Embodiment Form 1

Figure 1:
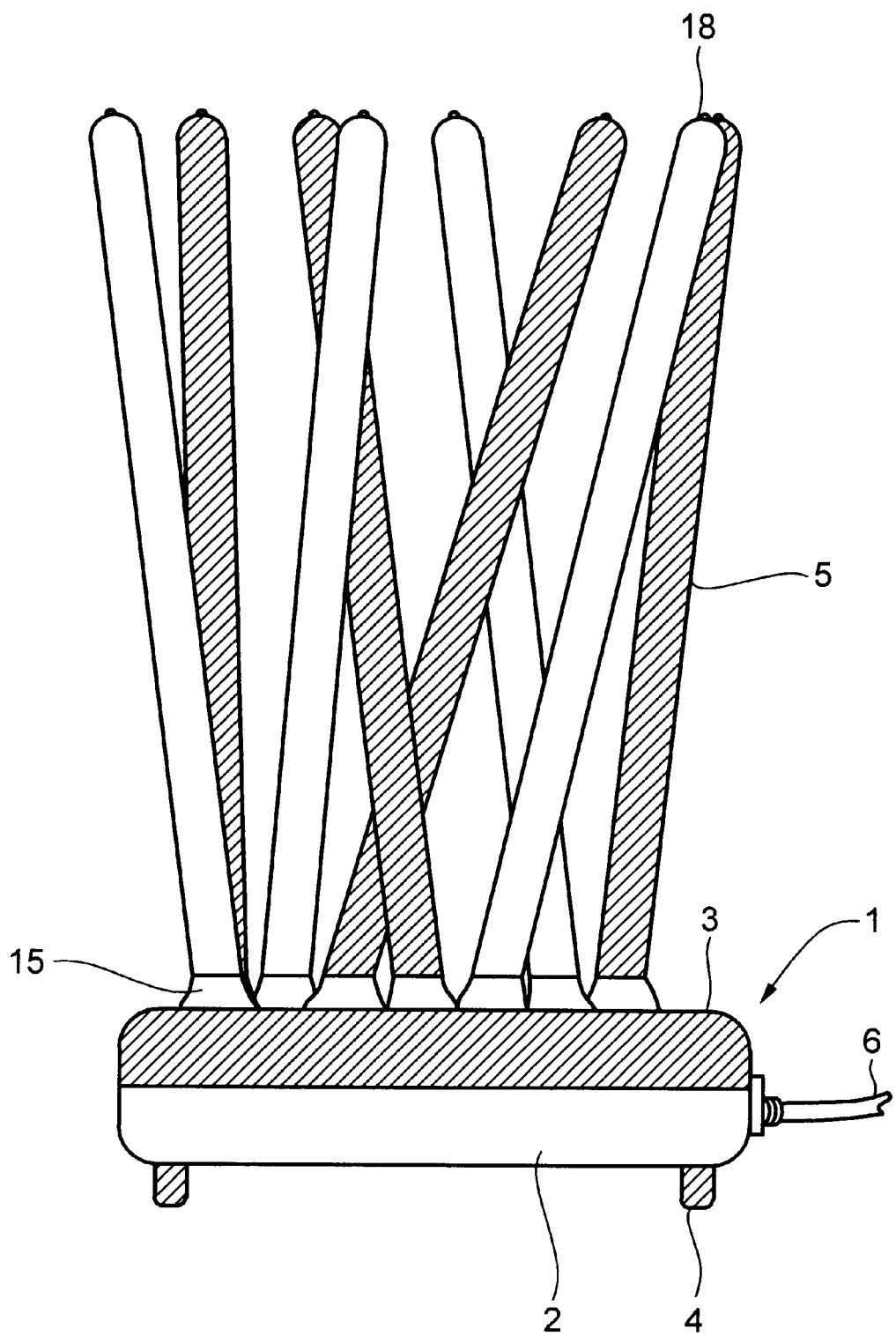
FIG. 1 shows a lateral view of the embodiment of the present device.
Figure 2:
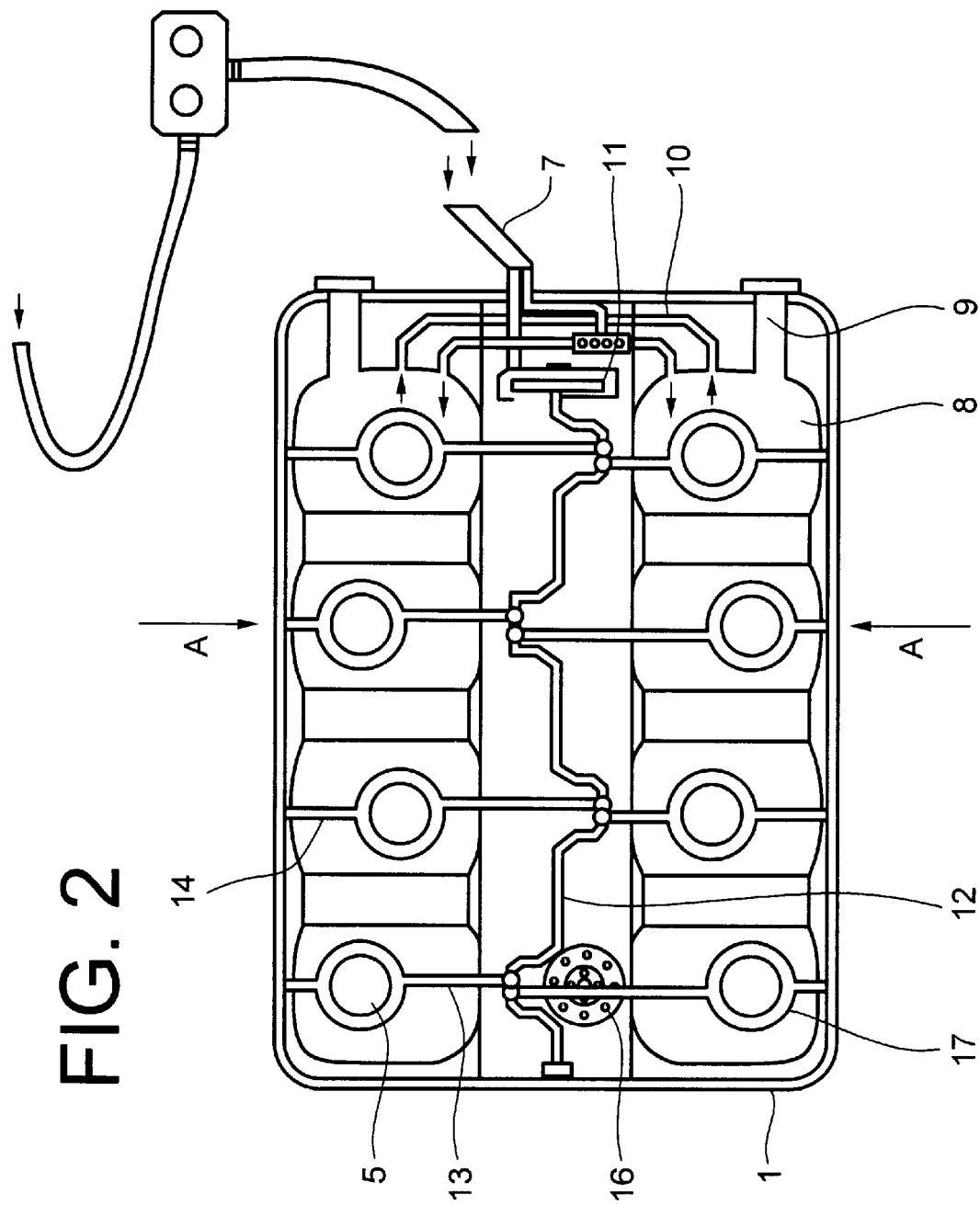
FIG. 2 shows a transected bird's eye view of the device shown in FIG. 1.
Figure 3:
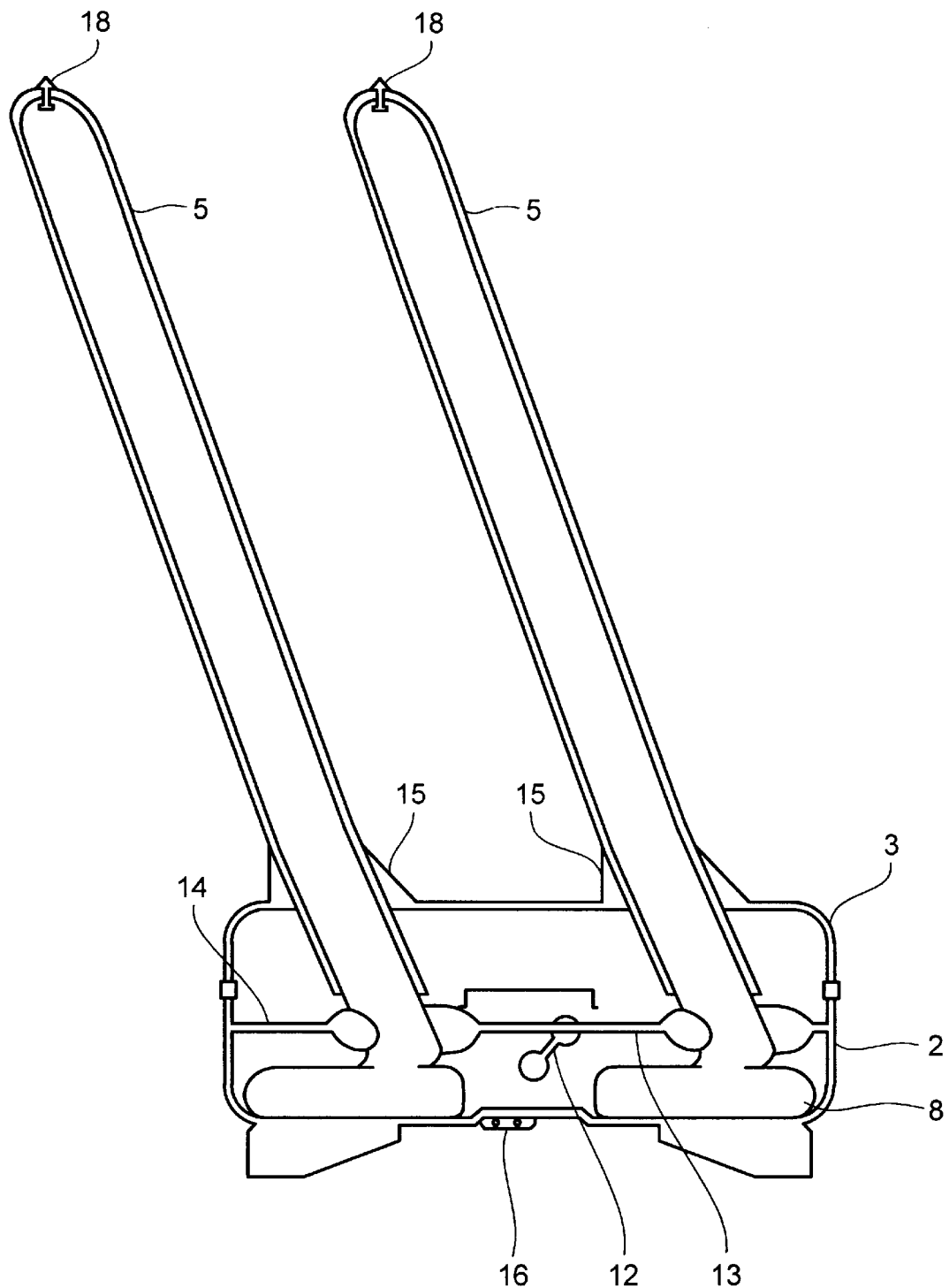
FIG. 3 shows the section A—A in FIG. 2.

FIGS. 1, 2 and 3 show a first preferred embodiment form of the present flame simulator, comprising a base member 1 which preferably is divided into a lower section 2 and an upper section 3. On the base member there may optionally be provided means, for example, rubber feet 4, for preventing the base member from sliding against the underlying surface during use. Base member 1 in this embodiment forms a protective shell around the inner components of the device as well as a mounting means therefor, and simultaneously can serve as a carry case for transport.

Inside the base member in the illustrated embodiment are provided two elongated chambers 8 from which air tubes 5 extend outward. The chambers 8 and air tubes 5 are preferably made of an air-tight fabric. The chambers may be filled with air or another gas from an air connector 7 through the air supply 10 passing from air connector 7 and to chambers 8 as well as between the chambers. In addition, a controlled portion of the air air stream is supplied through air connector 7 through an air supply to a pneumatic motor 11.

When the device is to be used, an air source is coupled to air supply 7, and the chambers 8 with their connected air tubes 5 are inflated. Air tubes 5 project out from openings in the upper section 3 of the base member, preferably through muffler 15, and stand up from the upper face of the base member. The air tubes may be made of a fabric having a color suitable for a flame simulator, or they may be covered with colored sleeves if so desired.

From air supply 7 the air lines 10 lead both to chambers 8 and to a pneumatic motor 11, as mentioned above. When the pressure in chambers 8 and air tubes 5 has risen sufficiently, i.e., when the air tubes have been inflated and extend upward from the device on their own power, the air stream is conducted to the motor 11 which drives a cam shaft 12 to which are attached stays 13 which are secured to the base of air tubes 5. Stays 13 are preferably fastened to a reinforced portion of the air tubes or to a ring 17 through which air tube 5 passes with a tight fit.

On rotation of cam shaft 12, the stay 13 will pull and push, respectively, on the base of air tube 5. The air tube passes through openings at the top of base member 1 above the base of the air tubes, thereby causing the upper part of air tubes 5 to move in the opposite direction of the base of air tubes 5. The air tube movement will give "life" to the air tubes, which resemble flames and thereby provide a realistic effect when the device is employed during a fire drill.

Stay 13 may be a rigid bar or, for example, a strap which pulls the base of the air tube in one direction. The elasticity provided in the inflated chambers and in the air tube is able to pull in the opposite direction of that in which the strap can pull. Alternatively, there may be provided a flexible member 14, such as an elastic cord, for example, which pulls in the opposite direction of the strap.

The air tubes may be equipped at the top thereof with safety valves 18 which ensure that the pressure within the air tubes does not cause them to burst. Alternatively, such safety valves may be provided on the chambers.

To enhance the realism when the present device is used in a practice drill, the device may be supplied with air containing smoke. The smoke may thus be released through safety valves 18 on the air tubes or the chambers, in addition to which the air which drives motor 11 is released through release valve 16.

To ensure that the device stands firmly in place during use, the base member may be constructed of a relatively heavy material. If this is inconvenient for reasons of transport, the device can be rendered heavier by, for example, filling water into chambers 8 through the filling aperture 9, or special ballast chambers may be provided in the base member.

During a fire drill, the use of extinguishing agents may be important. The present device can be "extinguished" by such agents and the "flames" can be dampened by lowering the air pressure, and optionally can be caused to "flare up" again later.

For purposes of transporting it to a training exercise and for transport after the completion of the drill, the device may be equipped with a handle, not shown.

The illustrated embodiment of the flame simulator is provided with two elongated chambers. However, embodiment forms having one chamber, or more than two chambers, may be envisioned. The movement of air tubes 5 on the illustrated embodiment takes place with the aid of a pneumatic motor 11 coupled to a cam shaft 12. A cam shaft of this type may, however, also be driven by a different type of power, such as an electric motor, for example. In addition, the cam shaft may conceivably be replaced by other devices to move the air tubes 5. For example, simple flame simulators having one air tube 5 or only a few air tubes 5 may be moved by a manually operated device such as, for example, a cord that may be pulled and released again to provide the same movement.

Also, is not a requirement that the chambers reside in a separate base member. The chambers may be placed upon a rigid base plate which provides stability, or the chambers themselves may be produced in a material which provides the necessary stability.

Embodiment Form 2

Figure 4:
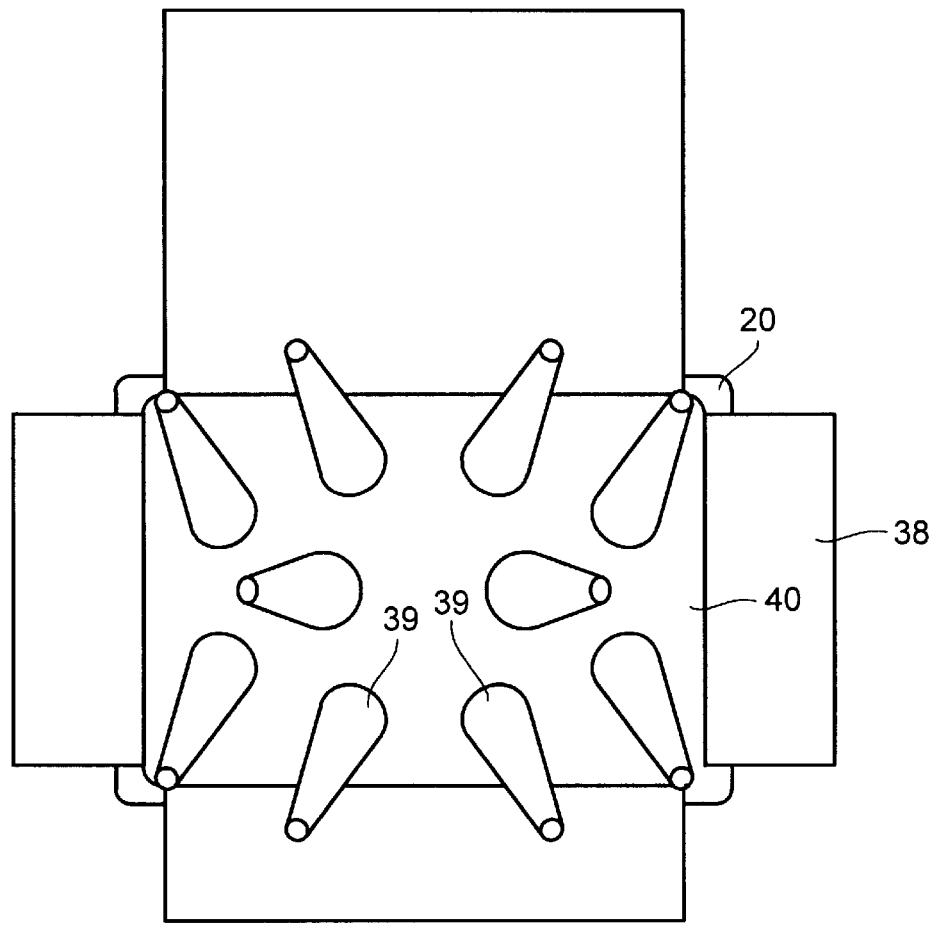
FIG. 4 shows a bird's eye view of an alternative embodiment.
Figure 6:
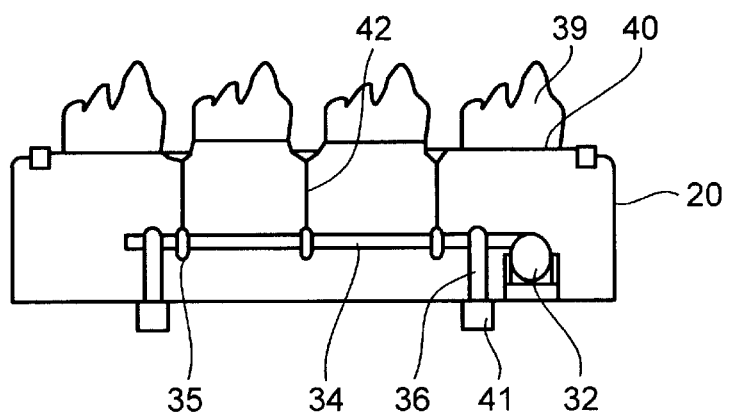
FIG. 6 shows a transected, lateral view of the base member for the embodiment according to FIG. 4.
Figure 5:
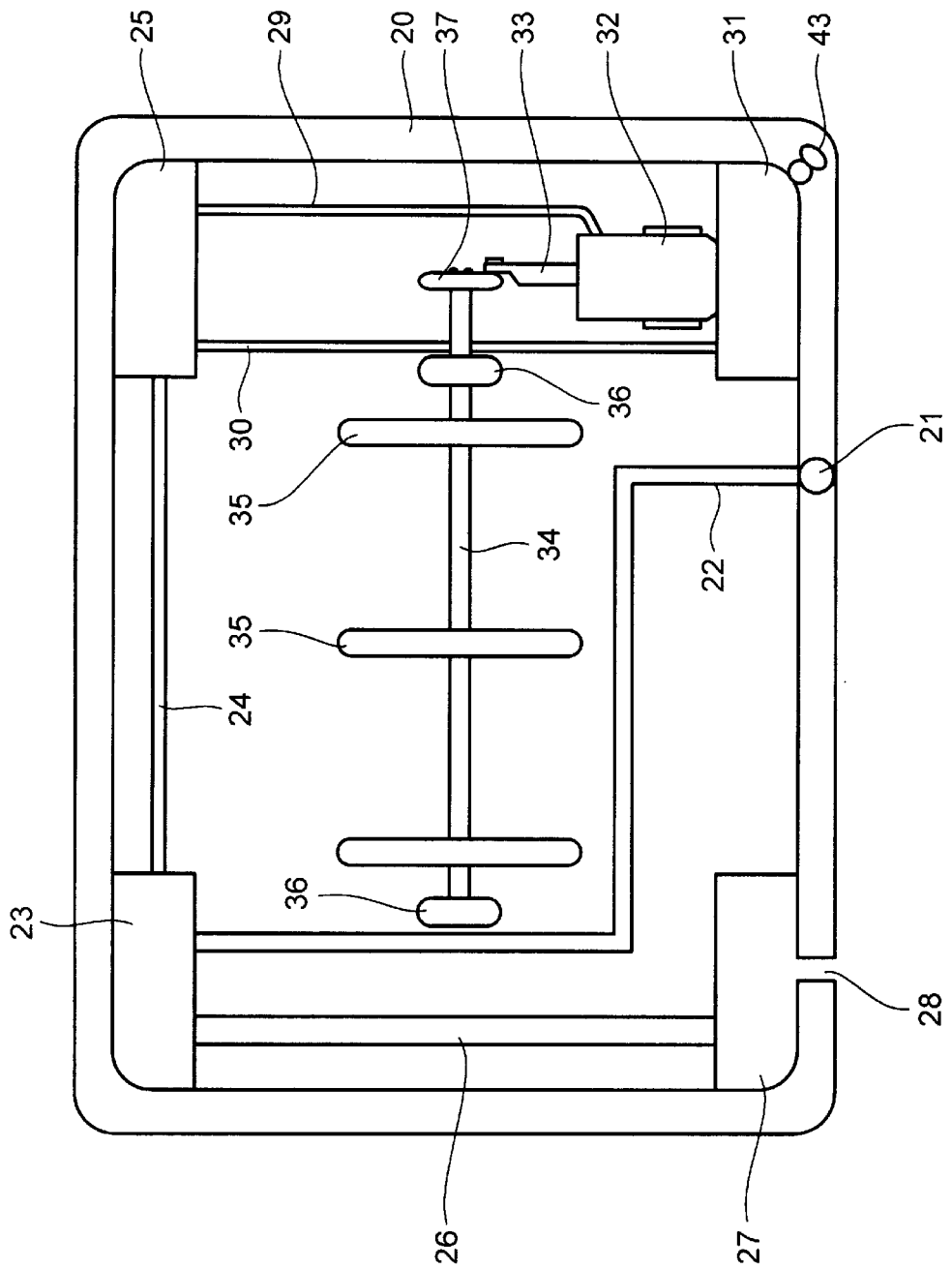
FIG. 5 shows a transected bird's eye view of the base member for the embodiment according to FIG. 4.

FIGS. 4, 5 and 6 show a second preferred embodiment form of the present invention. The device is again constructed on a base member 20, which is a shell that protects the interior components of the device. Base member 20 in the illustrated embodiment consists of a box open at the top, where stretched across the top is a flexible, air-tight diaphragm 40, preferably a rubber diaphragm. Air tubes 39 are secured to the diaphragm 40 through openings in diaphragm 40, thus bringing the interior of the air tubes into direct communication with the interior of base member 20.

It may be preferable to attach rubber mats 38 to base member 20, as shown on FIG. 4. These rubber mats may serve the dual function of stabilizing the device during use and preventing extinguishing water from flowing in under the device and thereby causing it to move, in addition to the fact that they may serve as a protective "lid" over the device when not in use. When the device is packed up, rubber mats 38 will be folded to the side and will lie down as shown on FIG. 4 when the air tubes are inflated.

FIGS. 5 and 6 show the transected device in bird's eye view and viewed from the side, respectively. The flame simulator is driven by compressed air supplied through air supply 43 from a compressor, a container of compressed air, or a similar means. From air supply 43 the air is passed to a pressure reducing valve 31, which ensures that the air pressure is not excessive. From pressure reducing valve 31 the air is conducted to a distributing valve 25 through air line 30. Distributing valve 25 conducts a portion of the compressed air into the interior of base member 20 and runs therefrom into air tubes 39 and fills them with air. In addition, the remaining compressed air from distributing valve 25 runs via air line 29 to a drive means which, in this case, is a cylinder 32, which via piston arm 33 and arm 37 moves a shaft 34 with rocker arms 35. Shaft 34 is rotatably mounted in supports 26.

As piston arm 3 is moved back and forth by the compressed air, rocker arms 35 will tip up and down. Rocker arms 35 are, in turn, attached via straps to diaphragm 40 causing the diaphragm to be moved up and down and thereby setting air tubes 39 into swinging motion.

The device shown may be remotely controlled by means of a pressure driven remote control unit coupled to a control port 21. A control line 22 leads from the control port to a control valve 23 having control lines 24 and 26 connected to, respectively, the distributing valve 25 and a rapid ventilation valve 28. Optionally the control unit may also be coupled to the air supply 43 in order to open and to close off, respectively, the supply of air to the device.

Thus, with the aid of the remote control, an operator is able to control the air supply to the air tubes and the movement thereof by means of a control pulse being sent from pressure control valve 23 to distributing valve 25, which opens or closes off the compressed air to the air tubes and to cylinder 32. When the "fire is put out," the operator maneuvers the remote control so that pressure control valve 23 sends signals to distributing valve 25 to close off the air supply at the same time as the rapid ventilation valve is guided into open position causing the air tube to collapse rapidly when the compressed air is released from the device. The device is then ready to be reignited or to be packed up.

Although a pressure driven remote control is illustrated here, it is obvious that electric or electronic remote control of the device may also be relevant. In certain environments where the danger of fire is great, however, it is clearly undesirable to use electrically powered devices which could cause sparks to form.

Moreover, a person skilled in the art would easily be able to find other variants and embodiment forms based on the description above, without departing from the spirit and scope of the invention as defined in the claims.

What is claimed is:

1. A device for the simulation of fire during fire drills, comprising:
   at least one chamber;
   one or more substantially upright tongue-shaped members connected to the at least one chamber, the tongue-shaped members being made of a flexible fabric and being air tubes;
   an air supply means communicating through said chamber with respective air inlets of the air tubes by said air tubes each having a lower portion extending into said chamber;
   a chamber housing connected to an upper portion of said air tubes; and
   a reciprocal movement means for causing said air tubes to move or sway reciprocally and having stays attached to the air tubes near a lower end of said lower portion.

2. The device of claim 1, further comprising:
   a cam shaft connected to and operated by said drive means and,
   wherein each of said stays are attached at one end to the cam shaft.

3. The device of claim 2, wherein said drive means is a pneumatic motor.

4. The device of claim 2, wherein said drive means is an electric motor.

5. The device of claim 1, wherein the air tubes each comprise at least one outlet valve to prevent the air tubes from being damages by over pressurization.

6. The device of claim 5, wherein said air supply means provides smoke-mixed air which exits through said outlet valve.

7. The device of claim 5, wherein said flexible fabric is substantially gas-tight.

8. The device of claim 1, wherein said flexible fabric is substantially gas-tight.

9. A device for simulation of fire for use during fire drills, comprising:
   at least one chamber;
   one or more tongue-shaped air tubes connected to the at least one chamber, the air tubes being made of a flexible fabric and each having an air inlet at a lower end region;
   an air supply means communicating through said at least one chamber with respective air inlets of the air tubes at the lower end regions extending into said chamber;
   a reciprocal movement means for moving or swaying said air tubes reciprocally, the reciprocal movement means including a diaphragm of a flexible material to which said air tubes are attached, said diaphragm forming a housing part of said chamber; and
   a diaphragm movement means for causing the air tubes to move or sway reciprocally by providing a push or pull action at fixed locations on said diaphragm.

10. The device of claim 9, wherein said flexible fabric is substantially gas-tight.

11. The device of claim 9, wherein each of the air tubes include at least one outlet valve to prevent the air tubes from being damaged by high air pressure.

12. The device of claim 11, wherein said air supply means provides delivery of smoke-mixed air which exists through said outlet valve.

13. The device of claim 9, wherein said diaphragm movement means includes rocker arms on a shaft connected to and moved by a drive means, said rocker arm being connected to said fixed locations via straps.

14. The device of claim 13, wherein said drive means is a pneumatic motor.

15. The device of claim 13, wherein said drive means is an electric motor.

* * * * *